United States Patent
Sunata

(10) Patent No.: US 7,734,851 B2
(45) Date of Patent: Jun. 8, 2010

(54) INFORMATION PROCESSING APPARATUS, MANAGEMENT APPARATUS, AND COMMUNICATION METHOD

(75) Inventor: Jin Sunata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 505 days.

(21) Appl. No.: 11/761,213

(22) Filed: Jun. 11, 2007

(65) Prior Publication Data

US 2007/0288705 A1    Dec. 13, 2007

(30) Foreign Application Priority Data

Jun. 13, 2006    (JP)    ............................. 2006-163881

(51) Int. Cl.
*G06F 13/38*    (2006.01)
*H04N 1/41*    (2006.01)

(52) U.S. Cl. ........................ 710/68; 707/693; 710/34; 711/154

(58) Field of Classification Search ........................ None
See application file for complete search history.

(56) References Cited

U.S. PATENT DOCUMENTS

| | | | | |
|---|---|---|---|---|
| 6,247,015 | B1 * | 6/2001 | Baumgartner et al. | ........ 707/101 |
| 6,981,069 | B2 * | 12/2005 | Hanna et al. | .................... 710/5 |
| 7,565,348 | B1 * | 7/2009 | Waldin et al. | .................. 707/6 |

FOREIGN PATENT DOCUMENTS

JP    11-259392 A    9/1999

* cited by examiner

*Primary Examiner*—Gary J Portka
(74) *Attorney, Agent, or Firm*—Canon USA Inc IP Division

(57) ABSTRACT

An information processing apparatus includes a transmitting unit configured to transmit to a management apparatus transmission data containing data related to count data stored in the information processing apparatus, a pattern storing unit configured to store a type and an order of data related to count data as a pattern, a determining unit configured to determine whether a pattern of data related to count data which is to be transmitted by the transmitting unit matches a pattern of data related to count data stored in the pattern storing unit, and a transmission data reducing unit configured to reduce the amount of the transmission data to be transmitted by the transmitting unit if it is determined by the determining unit that the pattern of data related to count data which is to be transmitted by the transmitting unit matches a pattern of data related to count data stored in the pattern storing unit.

12 Claims, 12 Drawing Sheets

FIG. 7

| ORDER | COUNT TYPE | COUNT PARAMETER |
|---|---|---|
| 1 | COUNT A | 100 |
| 2 | COUNT A | 110 |
| ⋮ | ⋮ | ⋮ |
| 45 | COUNT A | 250 |

| COUNT DATA | COMMUNICATION STATUS |
|---|---|
| CHARGE | SUCCESSFUL |
| PARTS | SUCCESSFUL |
| CHARGE | FAILED |

| ORDER | COUNT TYPE | COUNT PARAMETER |
|---|---|---|
| 1 | CHARGE COUNT | 505, 23, 2, 2, 3 |
| 2 | CHARGE COUNT | 505, 23, 11, 2, 3 |
| ⋮ | ⋮ | ⋮ |
| 45 | CHARGE COUNT | 505, 23, 4, 2, 3 |

1050    1051    1052

```
<item xsi:type="ns2:serviceModeCountType"
 xmlns:ns2="http://xxx">
  <id xsi:type="xsd:int">101</id>
  <value xsi:type="xsd:long">2342</value>
</item>
  ..........
<item xsi:type="ns2:serviceModeCountType"
 xmlns:ns2="http://xxx">
  <id xsi:type="xsd:int">940</id>
  <value xsi:type="xsd:long">0</value>
</item>
```
901

```
<item xsi:type="ns2:serviceModeCountType"
 xmlns:ns2="http://xxx">
  <value xsi:type="xsd:long">2342</value>  ← ONLY VALUE IS TRANSMITTED
</item>
  ..........
<item xsi:type="ns2:serviceModeCountType"
 xmlns:ns2="http://xxx">
  <value xsi:type="xsd:long">0</value>  ←
</item>                                   ONLY VALUE IS TRANSMITTED
```
902

```
<cnt enc:arrayType="ns1:string[50]" xmlns:ns1="http://www.w3.org/2001/XMLSchema"
xsi:type="enc:Array">
<item xsi:type="xsd:string">505,23,2,2,3,2122</item>
<item xsi:type="xsd:string">505,23,11,2,3,2128</item>
<item xsi:type="xsd:string">505,23,4,2,3,6</item>
        :
        :
<item xsi:type="xsd:string">505,10,3,2,3,1</item>
<item xsi:type="xsd:string">505,15,4,2,2,0</item>
<item xsi:type="xsd:string">505,15,3,2,2,0</item>
</cnt>
```

1151

```
<cnt enc:arrayType="ns1:string[1]" xmlns:ns1="http://www.w3.org/2001/XMLSchema"
xsi:type="enc:Array">
<item xsi:type="xsd:string">
2122,2128,6,······,0, 0, 0,1,0,0</item>    ← ONLY COUNT DATA IS TRANSMITTED
</cnt>
```

1152

```
<cnt enc:arrayType="ns1:string[50]" xmlns:ns1="http://www.w3.org/2001/XMLSchema"
xsi:type="enc:Array">
<item xsi:type="xsd:string">505,23,2,2,3,2122</item>
<item xsi:type="xsd:string">505,23,11,2,3,2128</item>
<item xsi:type="xsd:string">505,23,4,2,3,6</item>
        :
        :
<item xsi:type="xsd:string">505,10,3,2,3,1</item>
<item xsi:type="xsd:string">505,10,3,2,3,1</item>    ← NEWLY ADDED DATA
<item xsi:type="xsd:string">505,15,4,2,2,0</item>
<item xsi:type="xsd:string">505,15,3,2,2,0</item>
</cnt>
```

1153

```
<cnt enc:arrayType="ns1:string[1]" xmlns:ns1="http://www.w3.org/2001/XMLSchema"
xsi:type="enc:Array">
<item xsi:type="xsd:string">
2122,2128,6,······,0, 0, 0,1,1,0,</item>
</cnt>
```

INFORMATION PROCESSING APPARATUS, MANAGEMENT APPARATUS, AND COMMUNICATION METHOD

BACKGROUND OF THE INVENTION

1. Field of the Invention

The present invention relates to techniques for reducing the amount of communication through monitoring of an image forming apparatus.

2. Description of the Related Art

In a technique disclosed in Japanese Patent Laid-Open No. 11-259392, a transmission source transmits data in accordance with a data output format (pattern), and a transmission destination performs processing based on the data format.

A system is known in which count data of an image forming apparatus is monitored by a monitoring apparatus via a network. In such a system, a technique of data transmission with expandability using a SOAP (Simple Object Access Protocol) schema is employed, since, for example, a pattern that can be acquired by a monitoring apparatus depends on each image forming apparatus in the system.

However, items to be monitored in the maintenance of an image forming apparatus have increased over the years, resulting in an increase in the amount of data flow across a network. In addition, the use of a SOAP schema increases redundant tags in data to be transmitted. This also causes an increase in the amount of data flow across the network.

SUMMARY OF THE INVENTION

The present invention has been made in view of the above circumstances. Accordingly, there is a need to reduce the amount of communication in the monitoring of image forming apparatuses. In addition, there is also a need for a technique which can handle a variety of types of patterns of data content transmitted from image forming apparatuses and frequent changes in the types, as well as reduce the amount of communication.

According to an exemplary embodiment of the present invention, an information processing apparatus capable of communicating with a management apparatus includes a transmitting unit configured to transmit to the management apparatus transmission data containing data related to count data stored in the information processing apparatus, a pattern storing unit configured to store a type and an order of data related to count data as a pattern, a determining unit configured to determine whether a pattern of data related to count data which is to be transmitted by the transmitting unit matches a pattern of data related to count data stored in the pattern storing unit, and a transmission data reducing unit configured to reduce the amount of the transmission data if it is determined by the determining unit that the pattern of data related to count data which is to be transmitted by the transmitting unit matches a pattern of data related to count data stored in the pattern storing unit.

According to an exemplary embodiment of the present invention, a management apparatus capable of communicating with an information processing apparatus includes a receiving unit configured to receive information transmitted from the information processing apparatus, the information containing data related to counting, a pattern storing unit configured to store a type and an order of data related to counting as a pattern, a determining unit configured to determine whether a pattern of data related to counting received by the receiving unit matches a pattern of data related to counting stored in the pattern storing unit, and a processing executing unit configured to execute processing in accordance with the pattern if it is determined that the pattern of data related to counting received by the receiving unit matches a pattern of data related to counting stored in the pattern storing unit.

With this arrangement, the amount of communication in the monitoring image forming apparatuses can be reduced. In addition, a variety of types of patterns of data content transmitted from image forming apparatuses and frequent changes in the types can be handled, and the amount of communication data can be reduced.

Further features of the present invention will become apparent from the following description of exemplary embodiments with reference to the attached drawings.

BRIEF DESCRIPTION OF THE DRAWINGS

FIG. 7 illustrates an example of a data structure of a table storing patterns of count data stored in a storage medium.

FIG. 8 illustrates an example of a data structure of a table storing a result of transmission of count data or the like stored in a storage medium.

FIG. 13 illustrates an example of a SOAP message transmitted from an image forming apparatus.

FIG. 14 illustrates an example of a SOAP message transmitted from an image forming apparatus.

DESCRIPTION OF THE EMBODIMENTS

Figure 1:
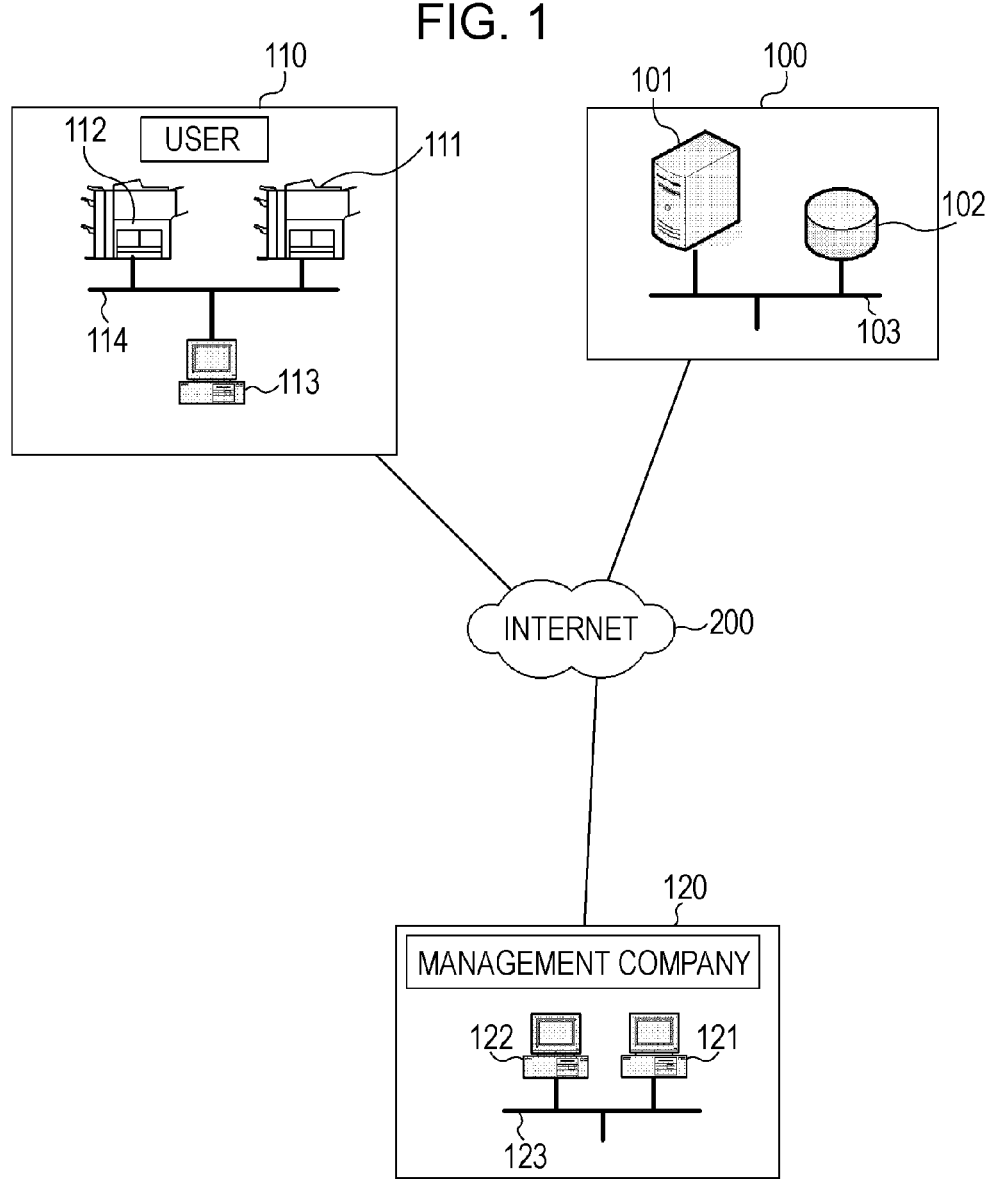
FIG. 1 schematically illustrates a configuration of an entire monitoring system.

In the following, exemplary embodiments of the present invention will be described with reference to the accompanying drawings. FIG. 1 schematically illustrates an example of an entire configuration of a monitoring system. The monitoring system includes a management system 100 having a management server 101 connected to Internet 200 via a LAN (local area network) 103 and a database 102 for storing all information related to the monitoring system. In the following example, a case will be described where individual apparatuses in a user facility are interconnected via a LAN. However, these user apparatuses can be interconnected via a wireless communication network or the like.

The management server 101 also functions as a WWW (World Wide Web) server. The management server 101 is accessed from a Web browser operating on personal computers (PCs) 121 and 122 of a management company 120 and a PC 113 of a user 110. With this configuration, information collected in the database 102 can be displayed on a Web browser screen, and data can be acquired. In this case, the PCs 121 and 122 are connected to a LAN 123 to communicate with the management system 100.

The database 102 can be physically included within the management server 101. The database 102 can also be implemented in another network environment as long as it can be accessed from the management server 101 via the Internet 200.

Image forming apparatuses 111 and 112 are directly connected to a LAN 114 to send and receive necessary information to and from the management system 100. The management server 101 and the image forming apparatuses 111 and 112 communicate with each other via the Internet 200 using HTTP (Hyper Text Transfer Protocol) or HTTPS (Hyper Text Transfer Protocol Security) to bypass a firewall.

Each of the image forming apparatuses 111 and 112 can be a digital multifunction image forming apparatus having a printing function, a facsimile function, and a copying function, a printer, a scanner, a facsimile, etc. Each of the image forming apparatus 111 and 112 can also be a single function printer that is not provided with a scanner function, for example. In addition, each of the image forming apparatuses 111 and 112 can include a print engine employing an inkjet technique as well as a print engine employing an electrophotography technique. In the following description, these various types of image forming apparatuses are collectively referred to as image forming apparatuses.

Figure 2:
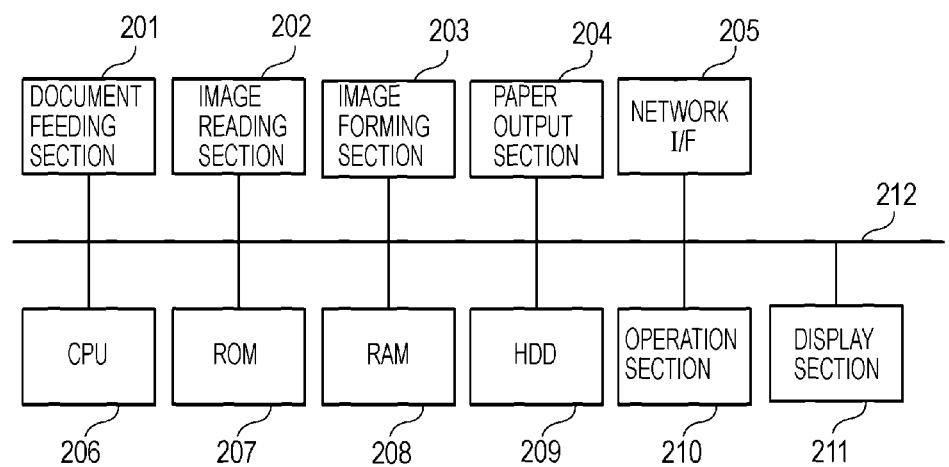
FIG. 2 is a block diagram illustrating a hardware configuration of an image forming apparatus.

Referring to FIG. 2, a hardware configuration of each of the image forming apparatuses 111 and 112 is illustrated. Each of the image forming apparatuses 111 and 112 has a document feeding section 201, an image reading section 202, an image forming section 203, a paper output section 204, a network interface 205, a CPU (central processing unit) 206, a ROM (read-only memory) 207, a RAM (random access memory) 208, an HDD (hard disk drive) 209, an operation section 210, and a display section 211, which are interconnected through a system bus 212. Hereinafter, the image forming apparatuses 111 and 112 are collectively referred to as the image forming apparatus unless it is necessary to distinguish them.

The document feeding section 201 feeds a document. An image reading section 202 reads the document. The image forming section 203 converts the read document or received data into a printing image and prints the image. The paper output section 204 outputs a printed sheet and performs processing such as sorting and stapling. The network interface 205 serves to communicate with a management server 101 via the Internet 200.

The CPU 206 controls various processing performed in the image forming apparatus. The ROM 207 stores a program and data related to each processing of the image forming apparatus. The RAM 208 temporarily stores data related to each processing of the image forming apparatus. The CPU 206 reads out the program from the ROM 207 into the RAM 208 and executes the program to provide various functions (see, for example, FIG. 3) and execute a processing procedure illustrated in a flowchart (see, for example, FIG. 6), which will be described below. The program can be stored in the HDD 209. In this case, the CPU 206 reads the program from the HDD 209 into the RAM 208 to execute the program. The HDD 209 stores, for example, count data and a pattern of count data as well as the program. Note that such a pattern of count data includes an order of count data included in a SOAP message, a type of count data, and a parameter of count data. In addition, the image forming apparatus is provided with a sensor (not shown) for detecting a remaining amount of a consumable and an error such as a paper jam.

The operation section 210 receives input of an instruction to the image forming apparatus. The display section 211 displays information including an operating status of the image forming apparatus, information on an operation performed through the operation section 210, and information output from each program operating on the image forming apparatus.

Figure 3:
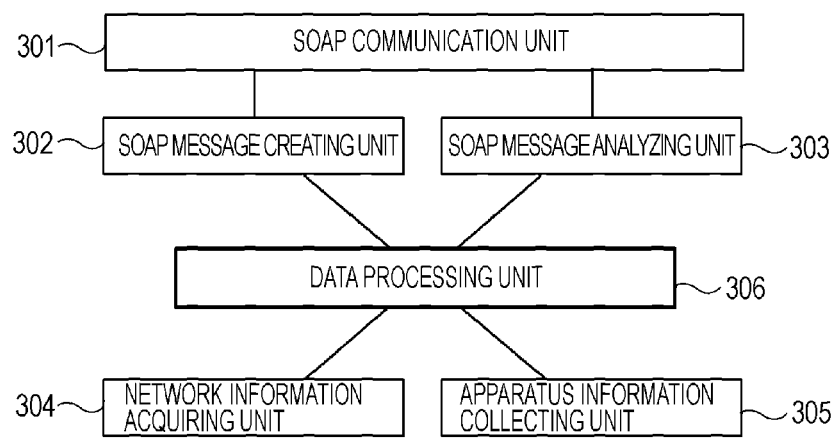
FIG. 3 is a block diagram illustrating a software configuration of an image forming apparatus.

FIG. 3 illustrates a software configuration of the image forming apparatus. As illustrated in the figure, the image forming apparatus includes a SOAP communication unit 301, a SOAP message creating unit 302, a SOAP message analyzing unit 303, a network information acquiring unit 304, an apparatus information collecting unit 305, and a data processing unit 306.

The network information acquiring unit 304 automatically acquires an IP (Internet Protocol) address, a DNS (Domain Name System) server address, and a gateway address in a DHCP (Dynamic Host Configuration Protocol) environment. When network information input through the operation unit 210 has been stored in the HDD 209, the network information acquiring unit 304 acquires the network information.

The apparatus information collecting unit 305 acquires information such as a schedule set in the image forming apparatus, count data stored in the image forming apparatus, and notification information such as "service call", "paper jam", and "toner empty", for example. These pieces of information are counted based on a count collection program and a result of detection performed by various sensors. For example, count data of a charge counter can be incremented when completion of printing or document scanning is detected by a sensor. In addition, count data of a parts counter can be incremented for each component of the image forming apparatus when printing or scanning is completed.

The apparatus information collecting unit 305 sends the acquired data or information to the data processing unit 306. The data processing unit 306 processes the received data or information and sends the processed data or information to the SOAP message creating unit 302. The SOAP message creating unit 302 creates a SOAP message (SOAP data) based on the received data or information. Specifically, the SOAP message creating unit 302 creates a SOAP message containing count data.

The SOAP communication unit 301 transmits the SOAP message created by the SOAP message creating unit 302 to the management server 101 via the network interface 205. The SOAP communication unit 301 also receives a SOAP message from the management server 101 via the network interface 205 and sends the received SOAP message to the SOAP message analyzing unit 303. The SOAP message analyzing unit 303 analyzes the SOAP message received from the SOAP communication unit 301. The data processing unit 306 performs internal processing (data processing) based on a result of the analysis of the SOAP message analyzing unit 303.

Figure 4:
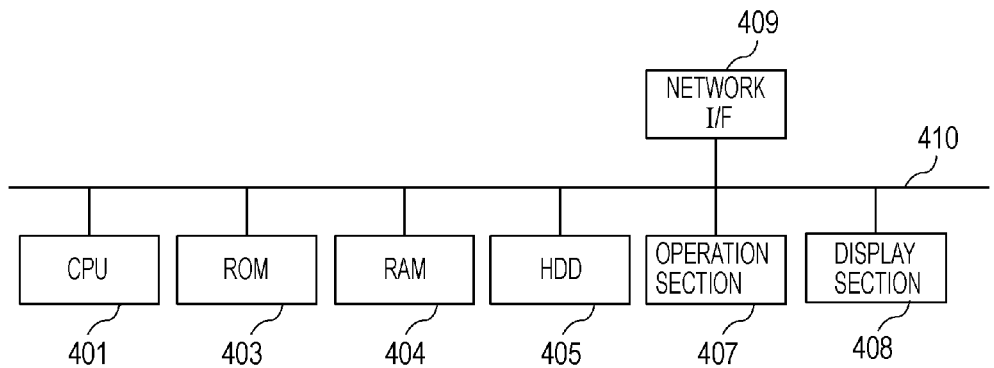
FIG. 4 is a block diagram illustrating a hardware configuration of a management server.

Referring to FIG. 4, a hardware configuration of the management server 101 is illustrated. The management server 101 may implement a hardware configuration generally employed in information processing apparatuses. The management server 101 has a CPU 401, a ROM 403, a RAM 404, an HDD 405, an operation section 407, a display section 408, and a network interface 409, which are interconnected through a system bus 410.

The CPU 401 controls various processing performed in the management server 101. The ROM 403 stores a program and data related to each processing of the management server 101. The RAM 404 temporarily stores data related to each processing of the management server 101. The CPU 401 reads out the program from the ROM 403 into the RAM 404 and executes the program so as to provide various functions (see, for example, FIG. 5) and execute a processing procedure illustrated in a flowchart (see, for example, FIG. 9), which will be described below. The program can be stored in the HDD 405. In this case, the CPU 401 reads the program from the HDD 405 into the RAM 404 to execute the program. The HDD 405 stores information related to the image forming apparatus (image forming apparatus 111 and 112), which is an object of monitoring (maintenance), information received from the image forming apparatus to be monitored, a pattern of count data, etc., as well as the program.

The operation section 407 receives input of an instruction to the management server 101. The display section 408 displays information including an operating status of the management server 101, information related to an operation performed through the operation section 407, and information provided by each program operating on the management server 101. The network interface 409 serves to communicate with the image forming apparatus to be monitored via the Internet 200.

Figure 5:
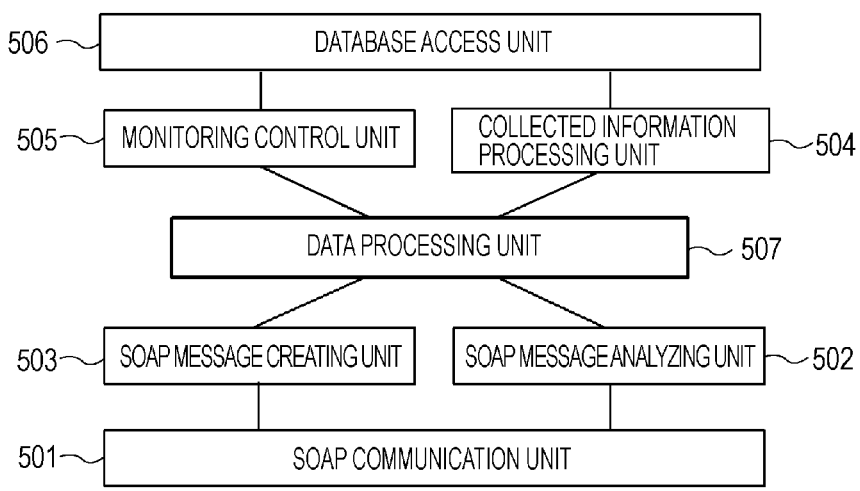
FIG. 5 is a block diagram illustrating a software configuration of a management server.

FIG. 5 illustrates a software configuration of the management server 101. As illustrated in the figure, the management server 101 includes a SOAP communication unit 501, a SOAP message analyzing unit 502, a SOAP message creating unit 503, a collected information processing unit 504, a monitoring control unit 505, a database access unit 506, and a data processing unit 507.

The SOAP communication unit 501 sends the SOAP message analyzing unit 502 a SOAP message (SOAP data) received from the image forming apparatus through the network interface 409. The SOAP communication unit 501 also sends the image forming apparatus a SOAP message created by the SOAP message creating unit 503 through the network interface 409.

The SOAP message analyzing unit 502 analyzes the SOAP message received from the SOAP communication unit 501 and sends data contained in the SOAP message to the data processing unit 507. The data processing unit 507 processes the data received from the SOAP message analyzing unit 502 and sends the processed data or information to the collected information processing unit 504 or the monitoring control unit 505. The data processing unit 507 also processes data or information received from the collected information processing unit 504 or monitoring control unit 505 as necessary and sends the processed data to the SOAP message creating unit 503.

The collected information processing unit 504 stores the data as it is sent by the data processing unit 507 or after processing the data, in the database 102 via the database access unit 506. The collected information processing unit 504 also executes processing related to the management system such as accumulation of count data and notification of error information to a service person or an administrator of a customer facility.

The monitoring control unit 505 manages a schedule on which information on the image forming apparatus is acquired and controls content of monitoring and a monitoring scheme. In addition, the monitoring control unit 505 transmits an instruction (SOAP message) to the image forming apparatus under monitoring, through the SOAP message creating unit 503, the SOAP communication unit 501, and the network interface 409 as necessary.

Figure 6:
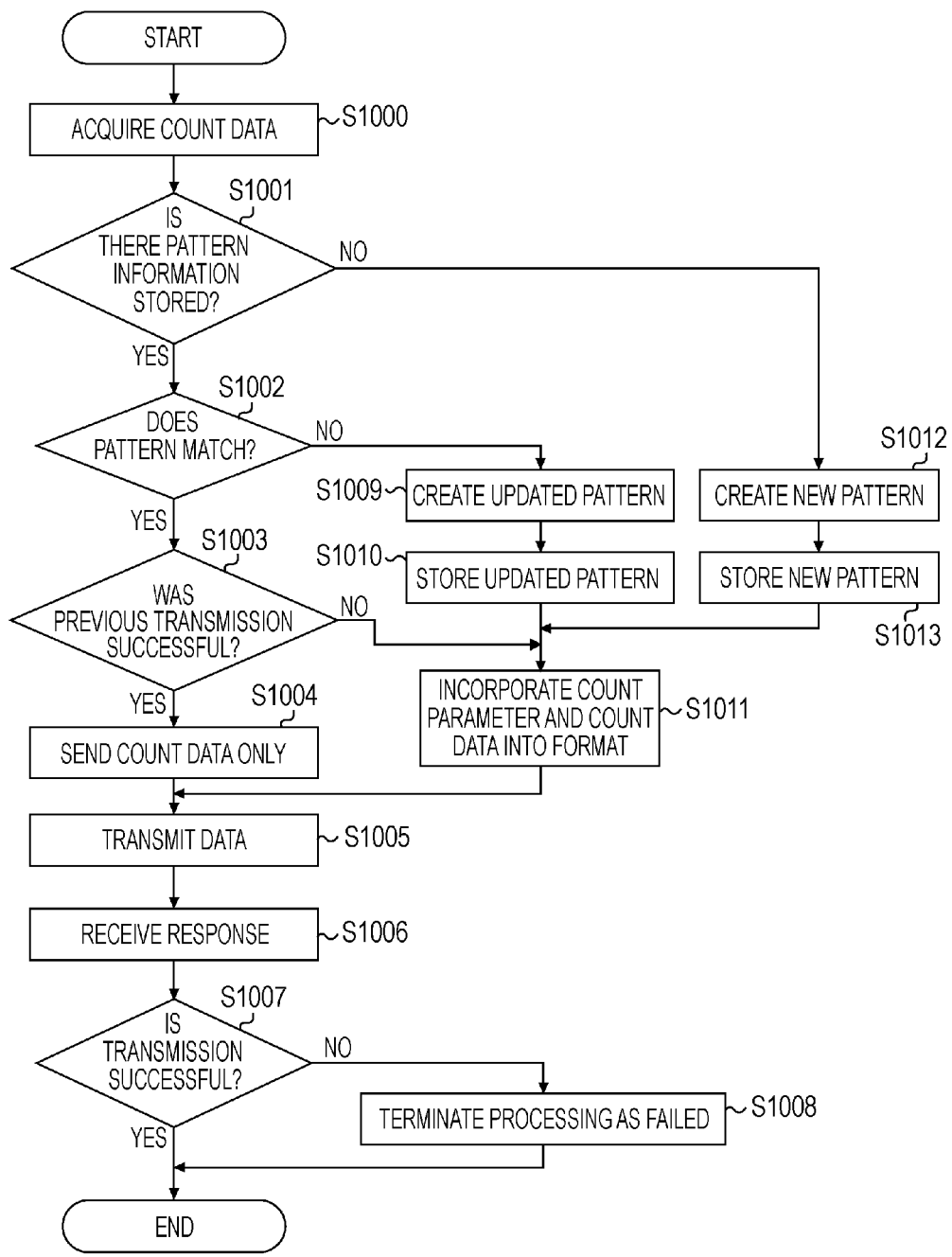
FIG. 6 is a flowchart illustrating an example of a processing procedure performed by an image forming apparatus for transmitting a SOAP message.

FIG. 6 is a flowchart illustrating an example of a processing procedure performed in the image forming apparatus for transmitting a SOAP message.

At STEP S1000, the apparatus information collecting unit 305 obtains count data to be transmitted from among count data stored in a memory of the image forming apparatus. Note that the count data to be transmitted refers to count data that is periodically provided to the management server 101. For example, there may be a case where information on a status indicating whether the image forming apparatus operates normally is periodically sent to the management server 101. Such information is also regarded as count data in this exemplary embodiment.

Information on the version of software being used is also regarded as count data. For example, when storing count data, the image forming apparatus determines whether the count data is intended to be transmitted. When it is determined that the count data is to be transmitted, the image forming apparatus stores the count data together with information indicating that the count data is to be transmitted. The apparatus information collecting unit 305 creates a list containing all of the count data to be transmitted and sends the list to the data processing unit 306.

At STEP S1001, the data processing unit 306 checks whether a pattern of count data which has previously been transmitted is stored in a storage medium such as the HDD 209. When count data is transmitted to the management server 101 for the first time (see, for example, FIG. 12A), there is no pattern stored in the storage medium. In this case, the processing procedure proceeds to STEP S1012 where the data processing unit 306 creates a new pattern.

Referring now to FIG. 7, processing for creating a pattern will be described. FIG. 7 illustrates an example of a data structure of a table for storing patterns of count data stored in a recording medium such as the HDD 209. The table illustrated in FIG. 7 is provided for each image forming apparatus.

As illustrated in FIG. 7, the table includes an order column 801 for storing an order of count data to maintain the order of count data, a count type column 802 for storing a count data type, and a count parameter column 803 for storing a parameter (an ID) of count data.

In this example, the count data type represents rough classification of counting performed by counters such as a charge counter and a parts counter. Thus, a charge count data indicates the number of sides printed or scanned (charge count data), which is used for charging a user printing fee. A parts counter indicates the number of sides or sheets for which a photosensitive drum is used (a parts count data), for example. The parts count data is used for estimating the life of each component of the image forming apparatus. A count parameter can indicate details of the charge count data such as information representing a sheet size and a color type (color or black and white).

In the example of FIG. 7, the table indicates that the count parameters of parts count data are transmitted in the order of 100, 110, . . . , 250.

Referring back to FIG. 6, in the case of STEP S1012, since no data is stored in the order column 801, the count type column 802, and the count parameter column 803, the data processing unit 306 organizes data to store a pattern.

At STEP 1013, the data processing unit 306 stores the organized data in the table of FIG. 7.

At STEP S1011, the data processing unit 306 sends the SOAP message creating unit 302 data in the count parameter column 803 (count parameter) and count data corresponding to the count parameter. The SOAP message creating unit 302 creates a SOAP message containing the received data and sends the created SOAP message to the SOAP communication unit 301.

At STEP S1005, the SOAP communication unit 301 transmits the received SOAP message to the management server 101. The data transmitted to the management server 101 includes the ID of the image forming apparatus (apparatus information) for identifying the data source (see, for example, FIG. 12A to FIG. 12C). Based on this image forming apparatus ID, the management server 101 determines whether pattern information corresponding to the image forming apparatus has already been stored at STEP S1109 of FIG. 9, which will be described below. As the image forming apparatus ID, an IP address, a MAC (Media Access Control) address, and a serial number specific to the image forming apparatus, for example, can be applied. A more detailed example of the data to be transmitted to the management server 101 will be described with reference to FIG. 13 and FIG. 14.

At STEP 1006, the SOAP communication unit 301 waits for a response SOAP message from the management server 101 so as to verify whether or not the transmitted SOAP message has been successfully received by the management server 101.

When a response SOAP message is received from the management server 101, the SOAP communication unit 301 determines that the transmission is successful, at STEP S1007, and sets the communication status of corresponding parts count data as "successful", as illustrated in FIG. 8. Then, the processing procedure is terminated. FIG. 8 illustrates an example of a data structure of a table for storing a transmission result (reception status) of count data stored in a storage medium such as the HDD 209.

If a response SOAP message is not received from the management server 101 within a predetermined time period, for example, the SOAP communication unit 301 determines that the transmission is failed, at STEP 1007, the procedure proceeds to STEP S1008. At STEP S1008, the SOAP communication unit 301 sets the communication status of corresponding count data as "failed", and then the processing procedure is terminated.

Now, processing to be performed if the data processing unit 306 determines in STEP S1001 that a pattern of count data which has previously been transmitted is stored in a storage medium such as the HDD 209 will be described.

If count data is transmitted for the second or subsequent time, a count data pattern, as illustrated in FIG. 7, exists in a storage medium such as HDD 209. Thus, the data processing unit 306 determines in STEP S1001 that a count data pattern is stored in the storage medium, and the processing proceeds to STEP S1002.

At STEP S1002, the data processing unit 306 determines that the pattern of the count data to be transmitted matches a pattern of count data stored in a storage medium such as the HDD 405 of the management server 101. Specifically, the data processing unit 306 checks whether a count type and a count parameter of count data, which have been stored in accordance with a count data order in the management server 101, match those of the count data to be transmitted to the management server 101. The procedure proceeds to STEP 1003, if it is determined the pattern of the count data to be transmitted matches a pattern of count data stored in the storage medium such as the HDD 405, and if not, the processing proceeds to STEP S1009.

At STEP S1003, the data processing unit 306 refers to the table stored in the storage medium such as HDD 405 as illustrated in FIG. 8 and determines whether the result of previous communication (transmission) of the parts count data was "successful". If the data processing unit 306 determines that the previous transmission of the parts count data was successful, the processing proceeds to STEP S1004. If the data processing unit 306 determines that the previous transmission of the parts count data was failed, the processing proceeds to STEP S1011. This is because a count parameter, which is necessary for data processing performed by the management server 101, has to be transmitted together with the count data.

At STEP S1004, the data processing unit 306 sends only the count data to the SOAP message creating unit 302. A feature of the present invention is that data is not transmitted if the same data has already been under the management of the management server 101, so that overlapping of data is prevented. Thus, the processing of STEP S1004 is not limited to the case where only a SOAP message containing only count data is created. Accordingly, a case where only a part of data is omitted from the SOAP message, for example, to be transmitted, in cooperation with the management server 101 can also be applied to the processing of STEP S1004. The SOAP message creating unit 302 creates a SOAP message containing the received count data and sends the created SOAP message to the SOAP communication unit 301. With this simplified transmission, the amount of communication data can be reduced (see, for example, FIG. 12B).

Figure 12A:
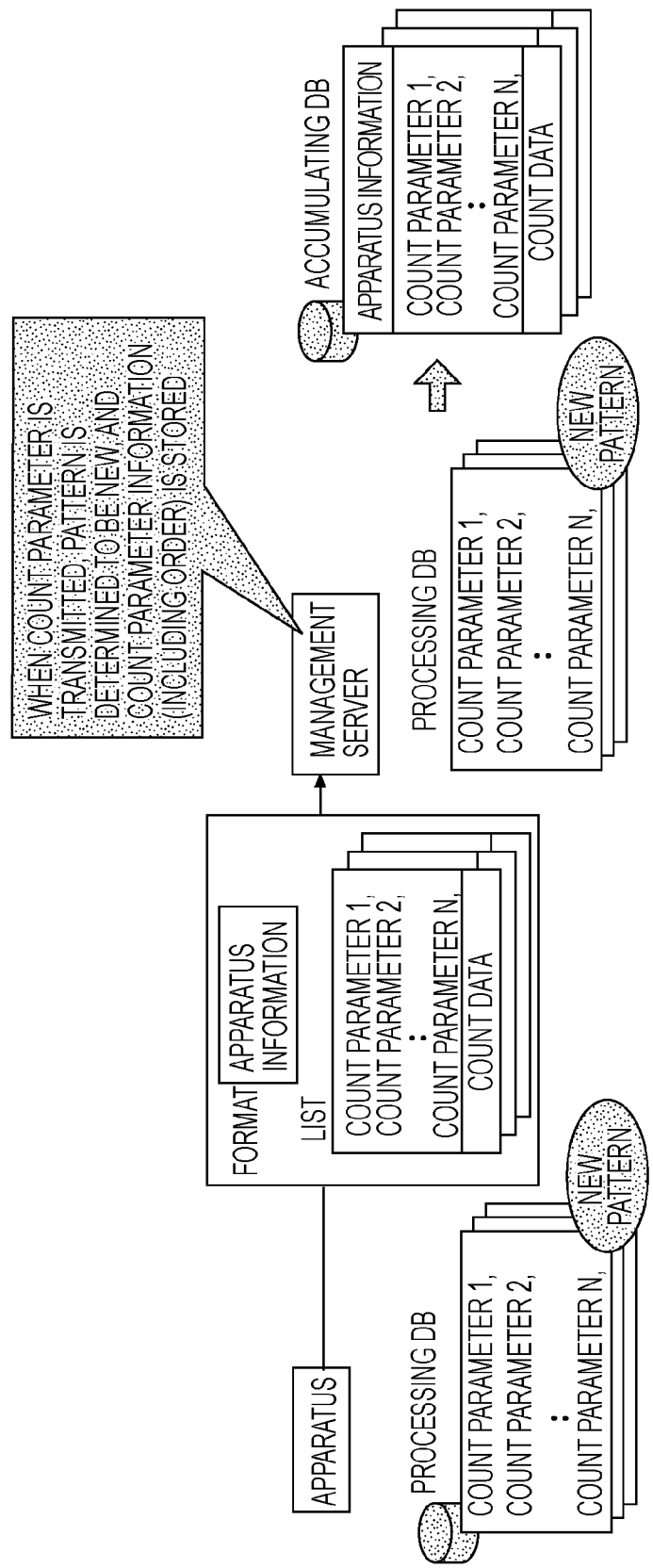
FIG. 12A to FIG. 12C illustrate examples of transmission schemes of count data.
Figure 12B:
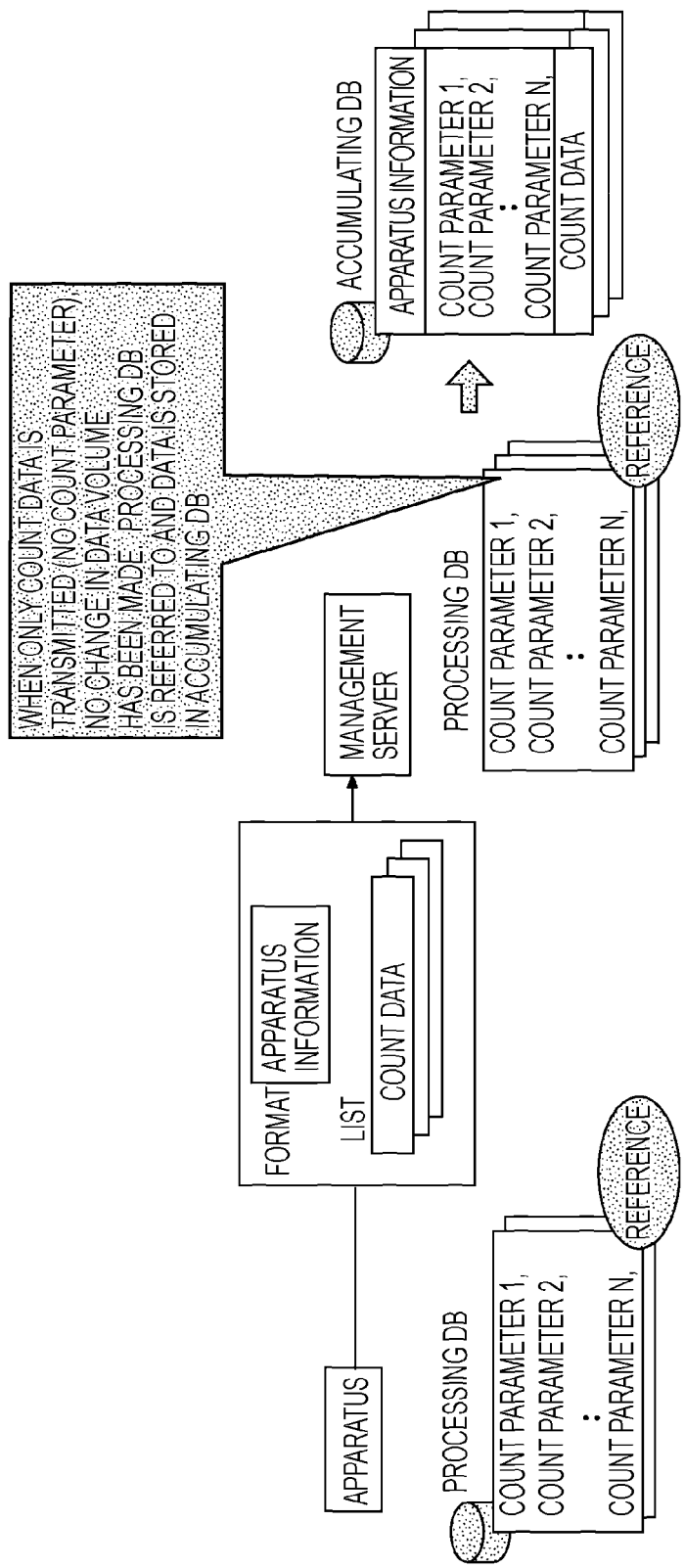
Figure 12C:
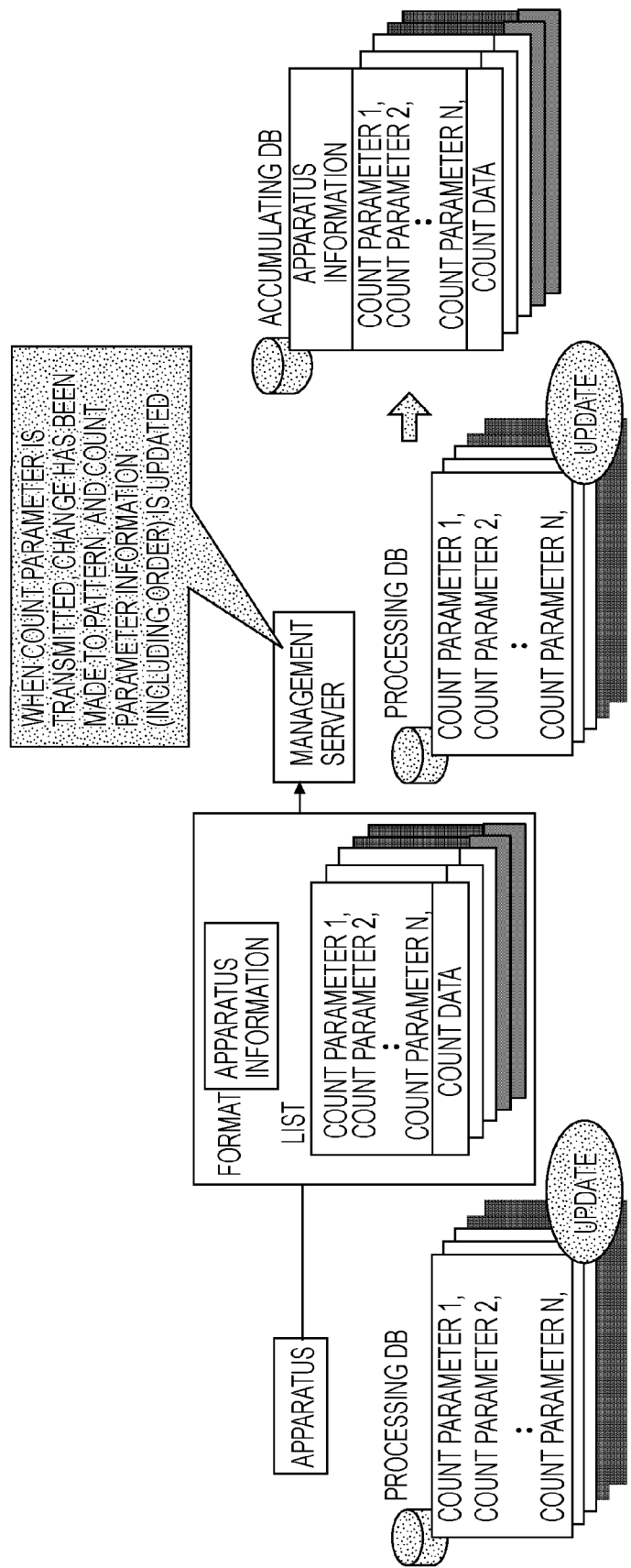

Now, a case is illustrated where a change (addition/deletion) has been made to count data to be transmitted or a problem has occurred in the image forming apparatus, and as a result a pattern of the count data to be transmitted is different from that of count data previously transmitted (see, for example, FIG. 12C).

At STEP S1009, the data processing unit 306 creates an updated pattern for the count data to be transmitted. At STEP S1010, the data processing unit 306 reflects the updated pattern on the table illustrated in FIG. 7. Then, the processing proceeds to STEP S1011.

Figure 9:
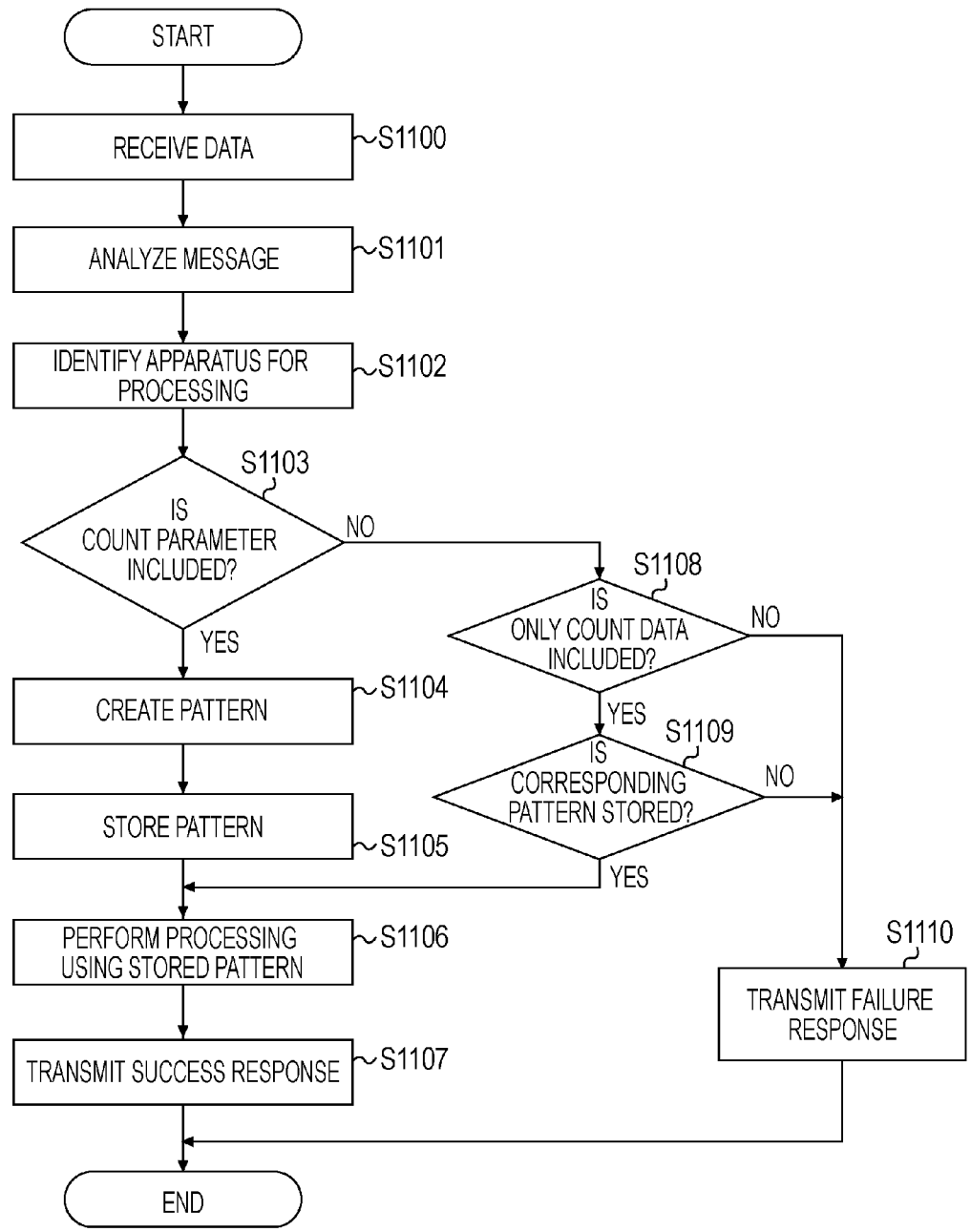
FIG. 9 is a flowchart illustrating an example of a processing procedure performed by a management server for receiving a SOAP message.

FIG. 9 is a flowchart illustrating an example of a processing procedure performed in the management server 101 for receiving a SOAP message.

At STEP S1100, the SOAP communication unit 501 receives a SOAP message transmitted from the image forming apparatus and sends the received SOAP message to the SOAP message analyzing unit 502.

At STEP 1101, the SOAP message analyzing unit 502 analyzes the received SOAP message based on the SOAP schema of the received SOAP message. At STEP S1102, the SOAP message analyzing unit 502 identifies an object for the processing (i.e., the image forming apparatus) based on the image forming apparatus ID (serial number) contained in the SOAP message. At STEP S1103, based on a result of the analysis, the SOAP message analyzing unit 502 determines whether the received SOAP message contains a count parameter.

If the SOAP message analyzing unit 502 determines in STEP S1103 that the received SOAP message contains a count parameter, the procedure proceeds to STEP S1104. On the other hand, if the SOAP message analyzing unit 502 determines that the received SOAP message does not contain a count parameter, the procedure proceeds to STEP S1108.

At STEP 1104, the data processing unit 507, which has received the count parameter etc., from the SOAP message analyzing unit 502, sends the count parameter etc. to the collected information processing unit 504. Upon receiving the count parameter etc., the collected information processing unit 504 determines that the count data is count data of a new pattern or count data whose pattern has been changed. Then, the collected information processing unit 504 creates a pattern based on the received information such as the count parameter with order information, the count type, and so forth. Subsequently, at STEP S1105, the collected information processing unit 504 stores the created pattern as a table in the HDD 405 or the database 102 through the data access unit 506. This table has a similar configuration as the table illustrated in FIG. 7. At this time, the collected information processing unit 504 stores this table in the HDD 405 or the database 102 through the database access unit 506 so as to be associated with apparatus information of each image forming apparatus.

At STEP 1106, the collected information processing unit 504 performs processing based on the information stored in the HDD 405 or the database 102, such as the count data pattern contained in the received SOAP message. Then, the collected information processing unit 504 stores the count data analyzed by the SOAP message analyzing unit 502, a processing result, etc. in the HDD 405 or the database 102 through the database access unit 506.

At STEP S1107, the collected information processing unit 504 notifies the data processing unit 507 that the processing is completed. Upon receiving the notification, the data processing unit 507 notifies the SOAP message creating unit 503 that the reception has been successfully completed. Upon receiving the notification, the SOAP message creating unit 503 creates a response SOAP message indicating the reception is successful. Then, the SOAP message creating unit 503 sends the created response SOAP message through the SOAP communication unit 501 to the image forming apparatus which is the transmission source of the SOAP message.

On the other hand, if it is determined in STEP S1103 that the received SOAP message does not contain a count parameter, the SOAP message analyzing unit 502 determines whether the data contained in the SOAP message transmitted from the image forming apparatus in the processing of STEP S1005 in FIG. 6 includes only count data (i.e., a part of the data transmitted from the image forming apparatus has been omitted). If the SOAP message analyzing unit 502 determines that the data contained in the SOAP message includes only count data, the procedure proceeds to STEP S1109. On the other hand, if it is determined that the SOAP message contains not only count data, the procedure proceeds to STEP S1110.

At STEP S1109, the data processing unit 507, which has received from the SOAP message analyzing unit 502 the count data contained in the SOAP message, sends the count data to the collected information processing unit 504. Based on the count data, the collected information processing unit 504 refers to the HDD 405 or the database 102 through the database access unit 506 to determine whether a pattern corresponding to the count data is stored.

Figures 10, 11:
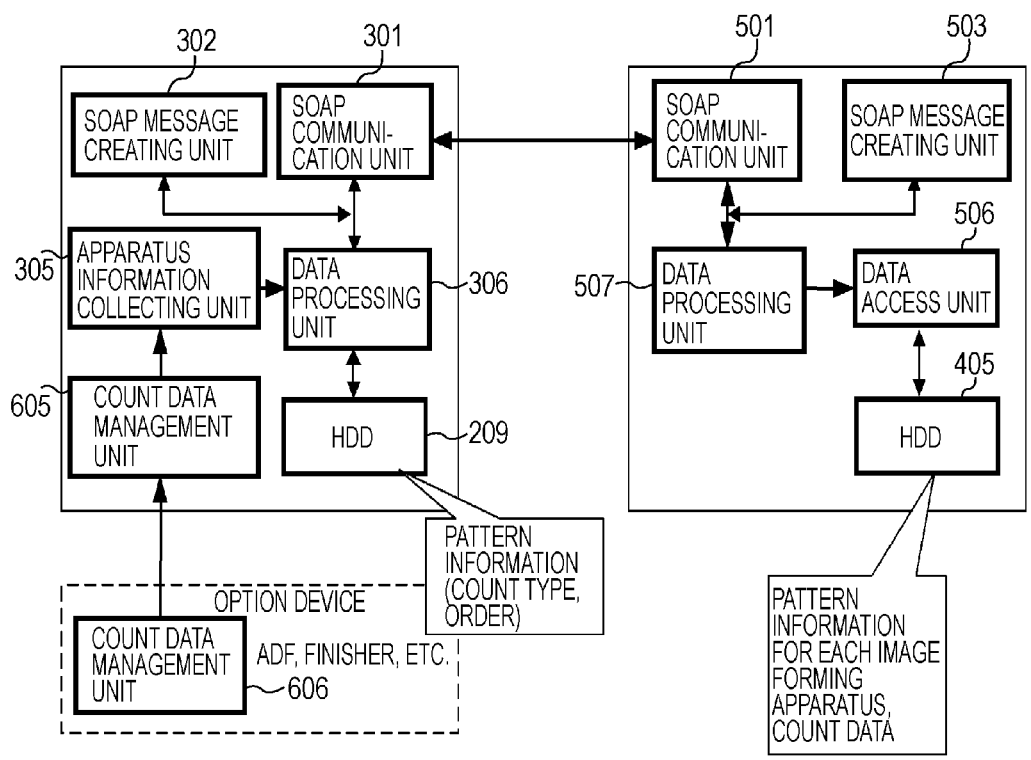
FIG. 10 illustrates an example of a data structure of a table storing patterns of count data stored in a storage medium.
FIG. 11 illustrates an example of processing for transmitting count data from an image forming apparatus.

If the collected information processing unit 504 determines in STEP S1109 that a pattern corresponding to the count data is stored, the procedure proceeds to STEP S1106. In this case (i.e., it is determined that no change has been made to the count data pattern in the transmission source of the SOAP message (image forming apparatus)), each count data (value) is sequentially stored in accordance with a pattern order as illustrated in FIG. 10 so as to be associated with a count parameter. On the other hand, if the collected information processing unit 504 determines that a pattern corresponding to the count data is not stored, the procedure proceeds to STEP S1110.

At STEP S1110, the collected information processing unit 504 notifies the data processing unit 507 that no corresponding pattern is stored. Upon receiving the notification, the data processing unit 507 notifies the SOAP message creating unit 503 that the reception processing is failed. Upon receiving the notification, the SOAP message creating unit 503 creates a response SOAP message indicating that the reception processing is failed. Then, the SOAP message creating unit 503 transmits the created response SOAP message through the SOAP communication unit 501 to the image forming apparatus which is the transmission source of the SOAP message.

FIG. 10 illustrates an example of a data structure of a table for storing patterns of count data stored in a recording medium such as HDD 405. As illustrated in the figure, the management server 101 stores an order column 1050, a count type column 1051, and a count parameter column 1052 of charge count data in a memory. When receiving a SOAP message 1151 as illustrated in FIG. 14, the management server 101 associates a count data "2122" with a count parameter "505, 23, 2, 2, 3" and associates a count data "2128" with a count parameter "505, 23, 11, 2, 3", for example. This indicates that the arrangement described above can reduce the amount of communication data.

FIG. 11 illustrates an example of processing of transmitting count data from the image forming apparatus. In this configuration of the image forming apparatus illustrated in the figure, the HDD 209, the SOAP communication unit 301, the SOAP message creating unit 302, the apparatus information collecting unit 305, and the apparatus information collecting unit 305, which are the same as those illustrated above, are included.

In addition to these components, a count data management unit 605 is included in the configuration. In addition, a count data management unit 606 is also included in an option device. Both the count data management unit 605 and the count data management unit 606 manage count data. In this example, the option device refers to a device such as an ADF (auto document feeder) and a finisher.

The option device does not have to include the count data management unit 606 as a component. For example, it is possible that the count data management unit 605 of the image forming apparatus manages count data related to the option device. However, for simplicity, in the following description, it is assumed that the count data related to the option device is managed by the count data management unit 606.

Now, a case will be described in which count data related to the option device is intended to be transmitted and the transmission of the count data is performed for the first time since the count data has been stored.

In such a case, at STEP S1000 (FIG. 6), the apparatus information collecting unit 305 acquires count data managed by count data management unit 605 and also acquires the count data managed by the count data management unit 606. Then, the apparatus information collecting unit 305 determines that a pattern corresponding to the count data is stored at STEP S1001, and thus the procedure proceeds to STEP S1002. At STEP S1002, the data processing unit 306 determines that the stored pattern does not match the pattern of the acquired count data, since the count data related to the option device has been newly added. Thus, the procedure proceeds to STEP S1009.

At STEP S1009, the data processing unit 306 creates an updated pattern of the count data to be transmitted. At STEP S1010, the data processing unit 306 reflects the created updated pattern on the table illustrated in FIG. 7. Then, the image forming apparatus performs the processing of STEP S1011 and subsequent processing.

As a result of the above processing procedure performed by the image forming apparatus, transmission data (SOAP message) such as illustrated in FIG. 12C is transmitted to the management server 101, as described below.

The SOAP message analyzing unit 502, which has received such a SOAP message, determines that the received SOAP message contains a count parameter at STEP S1103 (FIG. 9), and the procedure proceeds to STEP S1104. At STEP S1104, the data processing unit 507, which has received the count parameter etc. from the SOAP message analyzing unit 502, sends the count parameter etc. to the collected information processing unit 504. Upon receiving the count parameter etc. from the data processing unit 507, the collected information processing unit 504 determines that the received count data is of a new pattern or of a pattern which has been changed. Then, the collected information processing unit 504 creates a pattern based on the received information such as the count parameter with order information, the count type, and so forth. Subsequently, at STEP S1105, the collected information processing unit 504 stores the created pattern as a table in the HDD 405 or the database 102 through the data access unit 506.

FIG. 12A to FIG. 12C illustrate examples of schemes of transmission of count data. In these figures, an apparatus refers to the image forming apparatus. A processing DB (database) of the apparatus is stored in the HDD 209, for example. In addition, a processing DB and an accumulating DB of the management server are stored in the HDD 405, for example.

As described above, when the image forming apparatus transmits a SOAP message containing count data to the management server 101 for the first time, the image forming apparatus transmits the SOAP message in a format illustrated in FIG. 12A. Specifically, the image forming apparatus transmits to the management server 101 the SOAP message containing apparatus information (image forming apparatus ID) and a list containing at least one count parameter and corresponding count data.

In this case, the image forming apparatus performs the processing by following a procedure of STEP S1000, STEP S1001, STEP S1012, STEP 1013, STEP S1011, and STEP S1005 in the flowchart of FIG. 6, to transmit the SOAP message in such a format as illustrated in FIG. 12A.

When receiving the SOAP message in the format illustrated in FIG. 12A, the management server 101 newly creates a pattern and stores the created pattern as a table in the HDD 407.

In this case, the management server 101 performs the processing by following a procedure of STEP S1100, STEP S1101, STEP S1102, STEP S1103, STEP S1104, and STEP S1105, to create a new pattern and stores the created pattern as a table in the HDD 407.

The image forming apparatus transmits to the management server 101 a SOAP message in a format illustrated in FIG. 12B, if the transmission of the SOAP message is to be attempted for the second or subsequent time when no change has been made to the pattern of the count data and previous transmission was successful. Specifically, the image forming apparatus transmits to the management server 101 a SOAP message containing apparatus information (image forming apparatus ID) and a list containing the count data.

In this case, the image forming apparatus performs the processing by following a procedure of STEP S1000, STEP S1001, STEP S1002, STEP S1003, STEP S1004, and STEP S1005 in the flowchart of FIG. 6, to transmit the SOAP message in such a format as illustrated in FIG. 12B.

When receiving the SOAP message in the format illustrated in FIG. 12B, the management server 101 stores the count data etc. in the HDD 405.

In this case, the management server 101 performs the processing by following a procedure of STEP S1100, STEP S1101, STEP S1102, STEP S1103, STEP S1108, STEP S1109, and STEP S1106 to store the count data etc. in the HDD 405.

The image forming apparatus transmits a SOAP message in a format illustrated in FIG. 12C, if the transmission of the SOAP message is to be attempted for the second or subsequent time when a change has been made to the pattern of the count data. Specifically, the image forming apparatus transmits to the management server 101 the message containing apparatus information (image forming apparatus ID) and a list containing at least one count parameter and corresponding count data.

In this case, the image forming apparatus performs the processing by following a procedure of STEP S1000, STEP S1001, STEP S1002, STEP S1009, STEP S1010, STEP S1011, and STEP S1005 in the flowchart of FIG. 6, to transmit the SOAP message in such a format as illustrated in FIG. 12C.

When receiving the SOAP message in the format illustrated in FIG. 12C, the management server 101 updates a corresponding pattern in the table and the updated pattern is stored as a table in the HDD 407.

In this case, the management server 101 performs processing by following a procedure of STEP S1100, STEP S1101, STEP S1102, STEP S1103, STEP S1104, and STEP S1105 in the flowchart of FIG. 9, to update the pattern and store the updated pattern as a table in the HDD 407.

In the following, an example of a data format will be described with reference to FIG. 7, FIG. 13, and FIG. 14. FIG. 13 illustrates an example of a SOAP message transmitted from the image forming apparatus. FIG. 14 illustrates another example of a SOAP message transmitted from the image forming apparatus.

When count data is transmitted for the first time, as illustrated in a SOAP message 901 corresponding to a count type (count A) illustrated in FIG. 13, the image forming apparatus transmits to the management server 101 the count data in a format which contains a count parameter (id) and the count data (value). At this time, an "id" tag and a "value" tag are necessary for each count data, causing redundancy in the data. However, in the present embodiment, if the pattern of the count data to be transmitted is the same as the pattern of count data which has previously been transmitted, the image forming apparatus omits a part of transmission data (SOAP message) and transmits to the management server 101 a SOAP message 902, which contains only the count data ("value"), as illustrated in FIG. 13.

As described above using FIG. 7, the management server 101 stores the order column 801, the count type column 802, and count parameter column 803 corresponding to a count A. Thus, when receiving the SOAP message 902, the management server 101 associates the count data "2342" with the count parameter "100" and associates the count data "0" with the count parameter "110". With this arrangement, the amount of communication data can be reduced.

In a case where a change has been made to the transmission type of count data, for example, the image forming apparatus transmits to the management server 101 the count parameter and the count data as a set in the format of the SOAP message 901 illustrated in FIG. 13. This allows the management server 101 to recognize that a change has been made to the transmission type and thus update a corresponding count data pattern. With this arrangement, a new pattern of count data can be handled.

In addition, in the system according to the present embodiment, transmission and reception processing in the following manners are also possible.

As illustrated in a SOAP message 1150 (FIG. 14) corresponding to a charge count data, when the count data is intended to be transmitted for the first time, the image forming apparatus transmits the SOAP message 1150 containing a count parameter and the count data in an "item" tag. At this time, the "item" tag has to be provided for each charge count data, causing redundancy in transmission data. However, in the present embodiment, when pattern of count data to be transmitted is the same as the pattern of count data which has previously been transmitted, the image forming apparatus transmits to the management server 101 a SOAP message, for example, in a format in which only the count data is contained in an "item" tag, as illustrated in a SOAP message 1151 in FIG. 14.

In addition, as illustrated in a SOAP message 1152 in FIG. 14, the image forming apparatus transmits to the management server 101 a count parameter and count data as a set only when a change has been made to the transmission type of count data. This allows the management server 101 to recognize that a change has been made to the transmission type and update the pattern of the count data. With this arrangement, a new pattern of count data can be handled.

This update allows the management server 101 to process such data that contains only count data, as illustrated in a SOAP message 1153 in FIG. 14.

As described in the foregoing, according to the present embodiment, a variety of types of patterns and frequent changes in the types can be handled, and the amount of communication data can be reduced.

In the above-described embodiment, it is determined that a pattern stored in a storage medium such as the HDD 405 matches a pattern of count data to be transmitted. This determination processing can be performed using various schemes. For example, when a type and an order of data related to counting (count data) is stored as a pattern in an HDD or the like, the pattern can be stored as a hash value. More specifically, a hash value based on a type and an order of count data is stored. Then, the hash value corresponding to the count data is obtained every time when the count data is transmitted, such that it is determined whether or not the hash value matches a hash value that has previously been stored.

In the above-described embodiment, count data is transmitted via an image forming apparatus to the management server 101 in the form of a SOAP message. However, an apparatus serving to transmit a SOAP message is not limited to the image forming apparatus.

For example, the above-described processing performed by the image forming apparatus may be performed by a location monitoring apparatus. The location apparatus may be connected to a LAN in a user facility to collect various information and count data corresponding to a single or a plurality of image forming apparatuses and transmits the collected data to the management server 101. Thus, various information processing apparatuses, such as a collection monitoring apparatus as well as the image forming apparatus can execute the above-described processing.

However, when a location monitoring apparatus is employed, data to be transmitted is collected by each image forming apparatus. Then, the location monitoring apparatus stores a pattern of count data corresponding to each image forming apparatus and executes the processing procedure described with reference to the flowchart of FIG. 6 for each image forming apparatus.

The present invention may be applied to a system which includes a plurality of apparatuses as well as to a device which includes one apparatus (for example, a printer, a facsimile, a PC, a computer system including a server and a client).

The present invention also encompasses arrangements wherein a program for realizing the functions of the above-described embodiments are supplied either directly or from a remote site to a system or an apparatus having a computer capable of reading executing the supplied program code.

Thus, program code to be supplied and installed to the computer for realizing the functions of the above-described embodiments is also a feature that realizes the present invention. That is, the computer program for implementing the function of the above-described embodiments may be encompassed in the present invention.

In this case, the program is not restricted to any form, such as object code, a program executed by an interpreter, script data supplied to the Operating System, etc.

Examples of the recording media for supplying the program include magnetic recording media such as floppy disks, hard disks, optical disks, magneto-optical disks (MO), compact disk-read-only memory (CD-ROM), CD-recordable (CD-R), CD-rewriteable (CD-RW). For recording media, magnetic tapes, non-volatile memory cards, read-only memory (ROM), digital versatile disk-ROM (DVD-ROM), DVD-R, and so forth can be employed.

As another program supply method, a client computer may be connected to a homepage on the Internet using a browser, and the computer program itself of the present invention or a compressed file containing an automatic install function may be downloaded from the homepage to a recording medium such as a hard disk. A program code that constitutes the program according to an exemplary embodiment of the present invention may be divided into a plurality of files, and the files may be downloaded from different homepages. That is, a WWW server which causes a plurality of users to download a program file that causes a computer to implement the functional processing of the present invention may also be incorporated in the present invention.

In addition, an arrangement may be made wherein the program according to an exemplary embodiment of the present invention is encrypted and stored in a recording medium such as a CD-ROM and distributed to the user in this state, with key information for decrypting the encryption being downloaded from an Internet homepage, for example, to users which satisfy certain conditions, so that the encrypted program can be executed and installed to the computer using the key information.

In addition to the functions of the above-described embodiment being realized by the program read out being executed on a computer, the functions of the above-described embodiment may be realized by the Operating System running on the computer performing part or all of the actual processing based on instructions of the program.

Moreover, the functions described above may be realized by the program read out from the recording medium being written to memory provided to a function expansion board inserted into the computer or a function expansion unit connected to the computer, and the CPU of the function expansion board or function expansion unit performs part or all of actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-163881 filed Jun. 13, 2006, which is hereby incorporated by reference herein in its entirety.

What is claimed is:

1. An information processing apparatus capable of communicating with a management apparatus, the information processing apparatus comprising:

a transmitting unit configured to transmit to the management apparatus transmission data containing data related to count data stored in the information processing apparatus;

a pattern storing unit configured to store a type and an order of data related to count data as a pattern;

a determining unit configured to determine whether a pattern of data related to count data which is to be transmitted by the transmitting unit matches a pattern of data related to count data stored in the pattern storing unit;

a transmission data reducing unit configured to reduce an amount of the transmission data if it is determined by the determining unit that the pattern of data related to count data which is to be transmitted by the transmitting unit matches a pattern of data related to count data stored in the pattern storing unit;

a reception status storing unit configured to store a reception status of the management apparatus in response to a response from the management apparatus regarding information transmitted by the transmitting unit; and a judging unit configured to judge whether to perform reduction of the transmission data using the transmission data reducing unit based on the reception status of the management apparatus stored in the reception status storing unit.

2. The information processing apparatus of claim 1, wherein the pattern storing unit stores the pattern of data related to count data which is to be transmitted by the transmitting unit as a new pattern if it is determined by the determining unit that the pattern of data related to count data which is to be transmitted by the transmitting unit does not match a pattern of data related to count data stored in the pattern storing unit.

3. The information processing apparatus of claim 1, wherein the transmission data reducing unit does not transmit data which has been managed by the management apparatus.

4. The information processing apparatus of claim 1, wherein the pattern storing unit stores a hash value based on a type and an order of data related to count data, and wherein the determining unit stores the type and the order of data related to count data as a pattern using the hash value and performs determination based on the hash value.

5. The information processing apparatus of claim 1, further comprising a print engine.

6. A monitoring system comprising:

an information processing apparatus; and a management apparatus configured to manage the information processing apparatus, wherein the information processing apparatus comprises:

a transmitting unit configured to transmit to the management apparatus transmission data containing data related to count data stored in the information processing apparatus, a pattern storing unit configured to store a type and an order of data related to count data as a pattern, a determining unit configured to determine whether a pattern of data related to count data which is to be transmitted by the transmitting unit matches a pattern of data related to count data stored in the pattern storing unit, a transmission data reducing unit configured to reduce the amount of the transmission data if it is determined by the determining unit that the pattern of data related to count data which is to be transmitted by the transmitting unit matches a pattern of data related to count data stored in the pattern storing unit, a reception status storing unit configured to store a reception status of the management apparatus in response to a response from the management apparatus regarding information transmitted by the transmitting unit, and a judging unit configured to judge whether to perform reduction of the transmission data using the transmission data reducing unit based on the reception status of the management apparatus stored in the reception status storing unit, wherein the management apparatus comprises:

a receiving unit configured to receive information transmitted from the information processing apparatus, the information containing data related to count data, a pattern storing unit configured to store a type and an order of data related to count data as a pattern, a determining unit configured to determine whether a pattern of data related to count data received by the receiving unit matches a pattern of data related to count data stored in the pattern storing unit, and a processing executing unit configured to execute processing in accordance with the pattern if it is determined by the determining unit that the pattern of data related to count data received by the receiving unit matches a pattern of data related to count data stored in the pattern storing unit.

7. A method for an information processing apparatus to communicate with a management apparatus, the method comprising:

transmitting to the management apparatus transmission data containing data related to count data stored in the information processing apparatus;

determining whether a pattern of data related to count data which is to be transmitted matches a pattern of data related to count data stored in a pattern storing unit storing a type and an order of data related to count data as a pattern;

reducing the amount of the transmission data if it is determined the pattern of data related to count data which is to be transmitted matches a pattern of data related to count data stored in the pattern storing unit;

storing a reception status of the management apparatus in response to a response from the management apparatus regarding information transmitted; and judging whether to perform reduction of the transmission data based on the reception status of the management apparatus stored.

8. The method of claim 7, wherein the pattern storing unit stores the pattern of data related to count data which is to be transmitted as a new pattern if it is determined that the pattern of data related to count data which is to be transmitted does not match a pattern of data related to count data stored in the pattern storing unit.

9. The method of claim 7, wherein if the amount of the transmission data is reduced, the transmission data does not contain data which has been managed by the management apparatus.

10. The method of claim 7, wherein the pattern storing unit stores a hash value based on a type and an order of data related to count data, and wherein the determination is performed based on the hash value.

11. The method of claim 7, wherein information processing apparatus comprises a print engine.

12. A computer-readable storage medium storing computer-executable process steps, the computer-executable process steps causing a computer to execute the method of claim 7.

* * * * *